United States Patent
Shimizu et al.

(10) Patent No.: US 6,884,519 B2
(45) Date of Patent: Apr. 26, 2005

(54) MAGNETIC RECORDING MEDIUM, INCLUDING AN HCP STRUCTURED NI-ALLOY CONTROL FILM METHOD OF MANUFACTURE THEREFOR, AND MAGNETIC READ/WRITE APPARATUS

(75) Inventors: Kenji Shimizu, Ichihara (JP); Akira Sakawaki, Ichihara (JP); Hui Yang, Ichihara (JP); Hiro Mochizuki, Ichihara (JP); Hiroshi Sakai, Ichihara (JP); Takashi Hikosaka, Tokyo (JP); Soichi Oikawa, Chiba (JP)

(73) Assignees: Showa Denko K.K., Tokyo (JP); Toshiba Corporation, Tokyo (JP)

( * ) Notice: Subject to any disclaimer, the term of this patent is extended or adjusted under 35 U.S.C. 154(b) by 64 days.

(21) Appl. No.: 10/242,446

(22) Filed: Sep. 13, 2002

(65) Prior Publication Data

US 2003/0059651 A1 Mar. 27, 2003

Related U.S. Application Data

(60) Provisional application No. 60/324,532, filed on Sep. 26, 2001.

(30) Foreign Application Priority Data

Sep. 17, 2001 (JP) ........................................ 2001-282432

(51) Int. Cl.[7] .............................................. G11B 5/667
(52) U.S. Cl. ........................ 428/611; 428/668; 428/678; 428/680; 428/336; 428/694 TS; 428/694 TM; 360/131

(58) Field of Search ................................. 428/611, 668, 428/678, 680, 336, 694 TS, 694 TM; 360/131

(56) References Cited

U.S. PATENT DOCUMENTS

| 5,942,342 A | * | 8/1999 | Hikosaka et al. | ........ 428/694 R |
| 6,183,893 B1 | * | 2/2001 | Futamoto et al. | ...... 428/694 TS |
| 2002/0048693 A1 | * | 4/2002 | Tanahashi et al. | ..... 428/694 TS |
| 2003/0091798 A1 | * | 5/2003 | Zheng et al. | ................ 428/195 |
| 2003/0091868 A1 | * | 5/2003 | Shimizu et al. | ...... 428/694 TM |
| 2003/0099866 A1 | * | 5/2003 | Takahashi et al. | .... 428/694 BA |
| 2003/0104250 A1 | * | 6/2003 | Shimizu et al. | ..... 428/694 MM |
| 2003/0170500 A1 | * | 9/2003 | Shimizu et al. | ...... 428/694 TM |
| 2004/0001975 A1 | * | 1/2004 | Hikosaka et al. | ..... 428/694 BA |

* cited by examiner

Primary Examiner—Kevin M. Bernatz
(74) Attorney, Agent, or Firm—Sughrue Mion, PLLC

(57) ABSTRACT

A magnetic recording medium having excellent magnetic read/write characteristics and thermal stability characteristics, and a method of manufacturing therefor, and a magnetic read/write apparatus are provided. This magnetic recording medium comprises an orientation control film 3 that controls the orientation of a film provided directly thereabove, a perpendicular magnetic film 5, of which the axis of easy magnetization is generally oriented perpendicular to a substrate, and a protective film 6, that are provided on a non-magnetic substrate 1, wherein the orientation control film 3 is made of a non-magnetic material which contains 33 to 80 at % of Ni and one or more kinds of elements selected from Sc, Y, Ti, Zr, Hf, Nb and Ta.

10 Claims, 7 Drawing Sheets

1: NON-MAGNETIC SUBSTRATE
2: SOFT MAGNETIC UNDERCOAT FILM
3: ORIENTATION CONTROL FILM
4: INTERMEDIATE FILM
5: PERPENDICULAR MAGNETIZATION FILM
6: PROTECTIVE FILM
7: LUBRICATION FILM

1; NON-MAGNETIC SUBSTRATE
2; SOFT MAGNETIC UNDERCOAT FILM
3; ORIENTATION CONTROL FILM
4; INTERMEDIATE FILM
5; PERPENDICULAR MAGNETIZATION FILM
6; PROTECTIVE FILM
7; LUBRICATION FILM

| RING No. | DISTANCE BETWEEN CRYSTAL PLANES (Å) | CORRESPONDING CRYSTAL PLANE |
|---|---|---|
| (1) | 2.30 | hcp-Ni (100) |
| (2) | 1.59 | hcp-Ni (102) |
| (3) | 1.31 | hcp-Ni (110) |

-Hn; REVERSE MAGNETIC DOMAIN NUCLEATION FIELD

MAGNETIC RECORDING MEDIUM, INCLUDING AN HCP STRUCTURED NI-ALLOY CONTROL FILM METHOD OF MANUFACTURE THEREFOR, AND MAGNETIC READ/WRITE APPARATUS

CROSS-REFERENCE TO RELATED APPLICATION

This application claims the benefit pursuant to 35 U.S.C. §119(e) (1) of U.S. Provisional Application, No. 60/324,532 filed Sep. 26, 2001.

BACKGROUND OF THE INVENTION

1. Field of the Invention

The present invention relates to a magnetic recording medium, a method of manufacture therefor, and a magnetic read/write apparatus that uses the magnetic recording medium.

2. Description of the Related Art

A magnetic recording medium, that is now commercially available, is exclusively an in-plane magnetic recording medium wherein the axis of easy magnetization in a magnetic film is generally oriented parallel to the substrate.

In the in-plane magnetic recording medium, there is a possibility that the volume of bits becomes too small when the recording density is increased and magnetic read/write characteristics are deteriorated by the thermal stability effect. Also medium noise increases under the influence of diamagnetism in the boundary of recording bits when the recording density is increased.

In a so-called perpendicular magnetic recording medium of which the axis of easy magnetization in the magnetic film is generally oriented perpendicular to a substrate, in contrast, recording magnetic domains that have clear boundaries can be formed due to less influence of diamagnetism in the boundary of recording bits even when the recording density is increased, and therefore noise can be reduced. Moreover, since the recording density can be increased even if the volume of bits is comparatively large, strong thermal stability effects are exerted, resulting in much attention to the perpendicular magnetic recording medium. Consequently, a structure of a medium suited for use in perpendicular magnetic recording has been proposed.

Recently, there has been increasing demand for high-density recording in the magnetic recording medium. For this reason, such a magnetic recording medium has been proposed as a layer made of a soft magnetic material, called a soft back layer, is provided between a perpendicular magnetic film that serves as a recording layer and a substrate so as to improve the efficiency of the flow or the magnetic flux between a single pole type head and the magnetic recording medium, in order to use the single pole type head that has high capability of writing in the perpendicular magnetic film.

However, even when the soft back layer is provided, the magnetic recording medium does not have satisfactory performance in the read/write characteristics, thermal stability and the resolution of recording, and therefore a magnetic recording medium that is better in these characteristics has been required.

Japanese Patent No. 2669529 proposes to enhance lattice matching properties between a Ti undercoat film and a Co alloy magnetic film and to improve the orientation of the c axis of the Co alloy magnetic film by introducing the other element into the Ti undercoat film.

However, when using a Ti alloy undercoat film, the magnetic cluster size in the Co alloy magnetic film increases and the medium noise increases, thereby making it difficult to further increase the recording density.

Japanese Patent Application, First Publication No. Hei 8-180360 proposes to improve the orientation of the c axis of the Co alloy magnetic film by using an undercoat film comprising Co and Ru.

However, the mean crystal grain diameter of the undercoat film comprising Co and Ru increases. As a result, the magnetic grain diameter in the Co alloy magnetic film increases and the medium noise increases, thereby making it difficult to further increase the recording density.

Japanese Patent Application, First Publication No. Sho 63-211117 proposes to use a carbon-containing undercoat film.

However, when using the carbon-containing undercoat film, since this film has an amorphous structure, the orientation of the c axis of the perpendicular magnetic film deteriorates and the thermal stability deteriorates, thereby making it difficult to further increase the recording density.

Under the above-described circumstances, the present invention has been made, and an object thereof is to provide a magnetic recording medium that is capable of recording and read backing information at a higher density by improving the read/write characteristics and thermal stability, a method of manufacture therefor, and a magnetic read/write apparatus.

SUMMARY OF THE INVENTION

To achieve the object described above, the present invention employed the following constructions.

The magnetic recording medium of the present invention is characterized in that the orientation control film is made of a non-magnetic material which contains 33 to 80 at % of Ni and one or more kinds of elements selected from Sc, Y, Ti, Zr, Hf, Nb and Ta.

The orientation control film preferably has an hcp structure.

The orientation control film can be made of at least one kind selected from the group consisting of NiTa alloy, NiNb alloy, NiTi alloy and NiZr alloy.

A perpendicular magnetization anisotropy constant Ku of the perpendicular magnetic film is preferably equal to or higher than $1\times10^6$ erg/cc.

In the magnetic recording medium of the present invention, it is preferable that the perpendicular magnetic film have a composition containing CoCrPt as the major constituent and also have a Cr content equal to or higher than 16 and lower than 24 at % and a Pt content equal to or higher than 14 and lower than 24 at %, and a coercive force (Hc) is equal to or higher than 3000 (Oe), negative nucleation field (−Hn) is equal to or higher than 0 (Oe) and lower than 2500 (Oe), and a ratio of residual magnetization (Mr) to saturation magnetization (Ms), Mr/Ms, is equal to or higher than 0.9.

A mean crystal grain diameter of the orientation control film is preferably equal to or higher than 2 nm and lower than 20 nm.

A thickness of the orientation control film is preferably equal to or higher than 0.5 nm and lower than 20 nm.

It is preferable that the perpendicular magnetization have a B content equal to or higher than 0.1 at % and lower than 5 at % and $\Delta\theta 50$ is within a range from 2 to 10°.

A hard magnetic film made of a hard magnetic material can be provided between the non-magnetic substrate and the soft magnetic undercoat film.

The method of manufacturing a magnetic recording medium of the present invention comprises forming at least a soft magnetic undercoat film made of a soft magnetic material, an orientation control film that controls the orientation of a film provided right above, a perpendicular magnetic film of which the axis of easy magnetization is generally oriented perpendicular to a substrate, and a protective film, on a non-magnetic substrate, while controlling so that the orientation control film is made of a non-magnetic material which contains 33 to 80 at % of Ni and one or more kinds of elements selected from Sc, Y, Ti, Zr, Hf, Nb and Ta.

The magnetic read/write apparatus of the present invention comprises a magnetic recording medium and a magnetic head that records information on the magnetic recording medium and plays the information, wherein the magnetic recording medium comprises at least a soft magnetic undercoat film made of a soft magnetic material, an orientation control film that controls the orientation of a film provided directly thereabove, a perpendicular magnetic film of which the axis of easy magnetization is generally oriented perpendicular to a substrate, and a protective film, that are provided on a non-magnetic substrate, while the orientation control film is made of a non-magnetic material which contains 33 to 80 at % of Ni and one or more kinds of elements selected from Sc, Y, Ti, Zr, Hf, Nb and Ta.

BRIEF DESCRIPTION OF THE DRAWINGS

FIG. 10 is a schematic structural view showing an example of a magnetic read/write apparatus of the present invention.

DETAILED DESCRIPTION OF THE INVENTION

Figure 1:
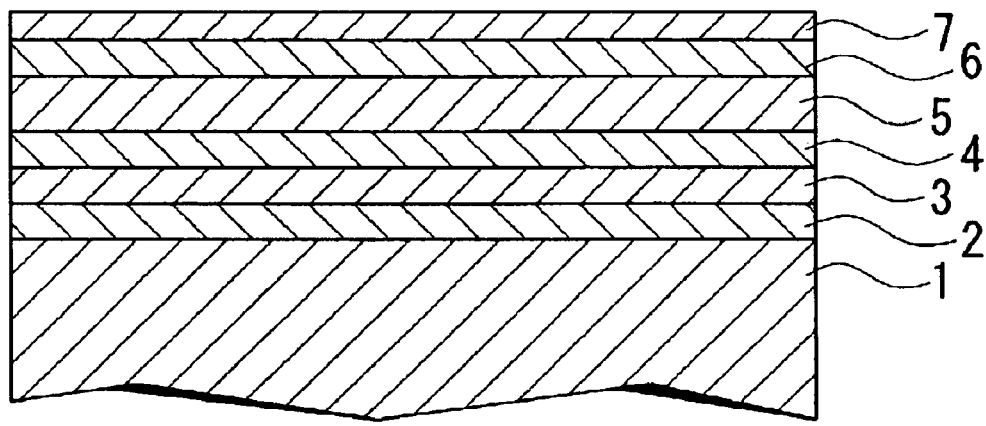
FIG. 1 is a partially sectional view showing the first embodiment of a magnetic recording medium of the present invention.

FIG. 1 shows the first embodiment of the present invention. The magnetic recording medium shown here has a structure in which a soft magnetic undercoat film 2, an orientation control film 3, an intermediate film 4, a perpendicular magnetic film 5, a protective film 6 and a lubrication film 7 are formed on a non-magnetic substrate 1.

As the non-magnetic substrate 1, a metallic substrate comprising a metallic material such as aluminum or aluminum alloy maybe used, and a non-metallic substrate comprising a non-metallic material such as glass, ceramic, silicon, silicon carbide or carbon may be used.

Examples of the glass substrate include amorphous glass substrate and crystallized glass substrate. As the amorphous glass, general-purpose soda-lime glass, aluminate glass and alumino silicate glass can be used. As the crystallized glass, lithium-based crystallized glass can be used. As the ceramic substrate, a sintered body containing general-purpose aluminum oxide, aluminum nitride or silicon nitride as the major constituent, or a fiber-reinforced article thereof can be used.

As the non-magnetic substrate 1, there can also be used substrates wherein the NiP film is formed on these substrates by a plating method, a sputtering method, or the like.

The soft magnetic undercoat film 2 is provided in order to increase the component perpendicular to the substrate of the magnetic flux from the magnetic head and to establish more firmly the magnetization of the perpendicular magnetic film 5, that records the information, in a direction perpendicular to the substrate 1.

This action becomes more remarkable when using a single pole type head for perpendicular recording as a read/write magnetic head.

The soft magnetic undercoat film 2 is made of a soft magnetic material. As the material thereof, a material containing Fe, Ni and Co can be used.

Examples of the material of the magnetizing stabilization film 9 include FeCo alloys (FeCo, FeCoV and the like), FeNi alloys (FeNi, FeNiMo, FeNiCr, FeNiSi and the like), FeAl alloys (FeAl, FeAlSi, FeAlSiCr, FeAlSiTiRu, FeAlO and the like), FeCr alloys (FeCr, FeCrTi, FeCrCu and the like), FeTa alloys (FeTa, FeTaC, FeTaN and the like), FeMg alloys (FeMgO and the like), FeZr alloys (FeZrN and the like), FeC alloys, FeN alloys, FeSi alloys, FeP alloys, FeNb alloys, FeHf alloys, and FeB alloys.

There can also be used a material having an Fe content equal to or higher than 60 at % composed of microcrystals comprising FeAlO, FeMgO, FeTaN, FeZrN or the like. In addition, it can also have a granular structure in which the microcrystals are dispersed in a matrix.

As the material of the soft magnetic undercoat film 2, a Co alloy having an amorphous structure, which contains 80 at % or higher of Co and also contains at least one or more of Zr, Nb, Ta, Cr, Mo or the like, can be used.

For example, CoZr, CoZrNb, CoZrTa, CoZrCr, and CoZrMo alloys can be used advantageously as the material.

The coercive force Hc of the soft magnetic undercoat film 2 is preferably equal to or lower than 200 (Oe) (preferably equal to or lower than 50 (Oe)).

The coercive force Hc that exceeds the above range is not preferable by the following reason. That is, soft magnetic characteristics become insufficient and the read back wave is not a so-called rectangular wave, but a distorted wave.

The saturation magnetic density Bs of the soft magnetic undercoat film 2 is preferably equal to or higher than 0.6 T (preferably equal to or higher than 1 T). Bs that is lower than the above range is not preferable for the following reason. That is, the read back wave is not a so-called rectangular wave, but a distorted wave.

Specifically, Bs·t, that is, the product of the saturation magnetic density Bs of the material that forms the soft magnetic undercoat film 2 and the film thickness t of the soft magnetic undercoat film 2, is preferably equal to or higher than 40 T·nm (more preferably equal to or higher than 60

T·nm). A Bs·t that is lower than the above range is not preferable for the following reason. That is, the read back wave is sometimes distorted and OW characteristics (overwrite characteristics) deteriorate.

It is preferable that the surface of the soft magnetic undercoat film 2 (the plane of the orientation control film 3 side) that forms the soft magnetic undercoat film 2 be partially or completely oxidized.

Consequently, magnetic fluctuation of the surface of the soft magnetic undercoat film 2 can be suppressed and, therefore, read/write characteristics of the magnetic recording medium can be improved by reducing noise caused by the magnetic fluctuation. Also read/write characteristics can be improved by refining crystal grains of the orientation control film 3 formed on the soft magnetic undercoat film 2.

The oxidized portion (oxidized layer) of the surface of the soft magnetic undercoat film 2 can be formed by a method in which the soft magnetic undercoat film 2 is exposed to a gas that includes oxygen after forming the soft magnetic undercoat film 2, or a method that introduces oxygen into the process gas when forming the portion of the film at the surface of the soft magnetic undercoat film 2 can be used.

Specifically, in the case in which the surface of the soft magnetic undercoat film 2 is exposed to an oxygen-containing atmosphere, it may be allowed to stand in oxygen alone, or a gas atmosphere obtained by diluting oxygen with argon or nitrogen for about 0.3 to 20 seconds. Also the method of exposing the soft magnetic undercoat film 2 to atmospheric air can be employed.

Particularly, when using a gas obtained by diluting oxygen with argon or nitrogen, stable manufacture can be conducted because it becomes easy to control the degree of oxidization of the surface of the soft magnetic undercoat film 2.

In the case in which oxygen is introduced into a film-forming gas of the soft magnetic undercoat film 2, for example, when using a sputtering method as the film-forming method, sputtering may be conducted using a process gas containing oxygen introduced therein during only a portion of the film-forming time. As the process gas, for example, a gas obtained by mixing argon with about 0.05% to 50% (preferably 0.1 to 20%) of oxygen is preferably used.

The orientation control film 3 is a film provided for controlling the orientation and crystal grain diameter of the intermediate film 4 and the perpendicular magnetic film 5 provided directly thereabove, and is made of a non-magnetic material which contains 33 to 80 at % (preferably 50 to 80 at %) of Ni and one or more kinds of elements selected from Sc, Y, Ti, Zr, Hf, Nb and Ta.

The content of one or more kinds selected from Sc, Y, Ti, Zr, Hf, Nb and Ta is preferably set to equal to or higher than 20 at %.

A Ni content that is lower than 33 at % is not preferable because the effect of improving the error rate disappears. On the other hand, the Ni content that exceeds 80 at % is not preferable because the orientation control film 3 is magnetized and medium noise increases.

The orientation control film 3 is preferably made of at least one selected from the group consisting of NiTa alloy, NiNb alloy, NiTi alloy and NiZr alloy.

As the NiTa alloy, an alloy (NiTa) comprising Ni and Ta may be used, and also an alloy, which contains this alloy as the major constituent and also contains the other element, can be used.

As the NiNb alloy, an alloy (NiNb) comprising Ni and Nb may be used, and also an alloy, which contains this alloy as the major constituent and also contains the other element, can be used.

As the NiTi alloy, an alloy (NiTi) comprising Ni and Ti may be used, and also an alloy, which contains this alloy as the major constituent and also contains the other element, can be used.

As the NiZr alloy, an alloy (NiZr) comprising Ni and Zr may be used, and also an alloy, which contains this alloy as the major constituent and also contains the other element, can be used.

The orientation control film 3 preferably has an hcp structure.

The use of the orientation control film 3 having an hcp structure makes it possible to improve the orientation of the perpendicular magnetic film 5 and to improve read/write characteristics and the thermal stability.

It can be confirmed by examining an electron diffraction image whether or not the orientation control film 3 has an hcp structure.

Figure 2:
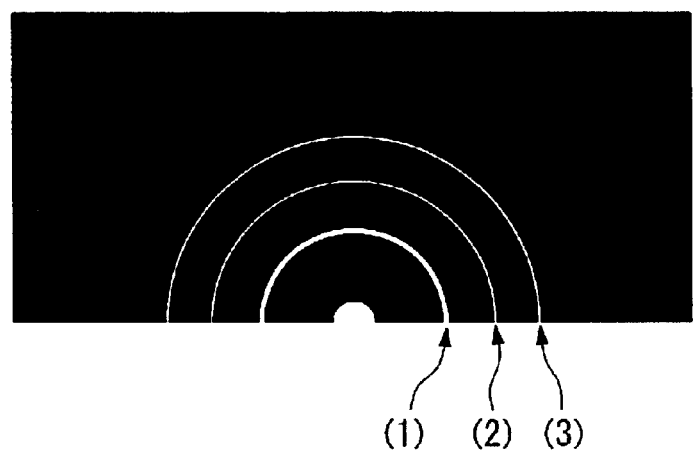
FIG. 2 is an electron diffraction image of an orientation control film.

FIG. 2 shows an electron diffraction image of the orientation control film 3 made of 60Ni-40Ta (which means 60 at % Ni-40% Ta).

A diffraction image corresponding to hcp-Ni was confirmed by FIG. 2 and it is found that the orientation control film 3 has an hcp structure.

The thickness of the orientation control film 3 is preferably equal to or higher than 0.5 nm and lower than 20 nm (more preferably from 1 to 10 nm).

When the film thickness of the orientation control film 3 is within a range from 0.5 to 20 nm (preferably from 1 to 10 nm), the perpendicular orientation of the perpendicular magnetic film 5 becomes particularly higher and the distance between the magnetic head and the soft magnetic undercoat film 2 becomes large during read back, and therefore read/write characteristics can be enhanced without deteriorating the resolution of the read back signal.

When the thickness falls below the above range, the perpendicular orientation of the perpendicular magnetic film 5 is lowered, and therefore read/write characteristics and the thermal stability deteriorate.

Also when the thickness exceeds the range described above, the perpendicular orientation of the perpendicular magnetic film 5 is lowered, and therefore read/write characteristics and the thermal stability deteriorate. Since the distance between the magnetic head and the soft magnetic undercoat film 2 becomes large during read back, the resolution of the read back signal decreases and the noise characteristics deteriorate, which is not preferable.

Since the surface profile of the orientation control film 3 exerts an influence on the surface profiles of the perpendicular magnetic film 5 and protective film 6, the mean surface roughness Ra of the orientation control film 3 is preferably set to 2 nm or less in order to lower the floating height of the magnetic head during recording and read back by reducing the surface unevenness of the magnetic recording medium.

Control of the mean surface roughness Ra to 2 nm or less makes it possible to reduce the surface unevenness of the magnetic recording medium, thereby to sufficiently lower the floating height of the magnetic head during recording and read back and to enhance the recording density.

The orientation control film 3 can contain at least one of oxygen and nitrogen. A method that introduces oxygen or nitrogen into the film-forming gas (process gas) when forming the orientation control film 3 can be used.

For example, when using a sputtering method as the film-forming method, a gas obtained by mixing argon with about 0.05% to 50% (preferably 0.1 to 20%) of oxygen or a gas obtained by mixing argon with about 0.01% to 20% (preferably 0.02 to 10%) of nitrogen is preferably used as the film-forming gas.

Crystal grains of the orientation control film 3 can be refined by introducing oxygen or nitrogen.

When the crystal grain diameter (mean grain diameter) of the orientation control film 3 is too small, the orientation of the perpendicular magnetic film 5 is lowered. On the other hand, when the crystal grain diameter is too large, crystal grains in the perpendicular magnetic film 5 become coarse. Therefore, the crystal grain diameter is preferably equal to or larger than 2 nm and smaller than 20 nm.

The mean grain diameter can be determined, for example, by observing crystal grains of the orientation control film 3 by a transmission electron microscope (TEM) and image-processing the image observed.

It is preferable to use, in the intermediate layer 4, a material having an hcp structure. It is preferable to use, in the intermediate, layer 4, a CoCr alloy, a $CoCrX_1$ alloy or a $CoX_1$ alloy ($X_1$: one or more kinds of elements selected from Pt, Ta, Zr, Ru, Nb, Cu, Re, Ni, Mn, Ge, Si, O, N and B).

The Co content of the intermediate layer 4 is preferably within a range from 30 to 70 at %.

The thickness of the intermediate layer 4 is preferably set to 20 nm or lower (preferably equal to or lower than 10 nm) in order to prevent deterioration of read/write characteristics due to coarsening of magnetic grains in the perpendicular magnetic film 5 and lowering of the resolution of recording due to an increase in distance between the magnetic head and the soft magnetic undercoat film 2.

Formation of the intermediate layer 4 makes it possible to enhance the perpendicular orientation of the perpendicular magnetic film 5, to enhance the coercive force of the perpendicular magnetic film 5, and to further improve the read/write characteristics and the thermal stability.

The perpendicular magnetic film 5 is a magnetic film, of which axis of easy magnetization is generally oriented perpendicular to the substrate, and preferably has a composition which contains CoCrPt as the major constituent and has a Cr content equal to or higher than 16 at % and lower than 24 at % (preferably equal to or higher than 18 at % and lower than 22 at %) and the Pt content equal to or higher than 14 at % and lower than 24 at % (preferably equal to or higher than 15 at % and lower than 20 at %).

The Cr content of lower than 16 at % is not preferable for the following reason. That is, since exchange coupling between magnetic grains increases, the magnetic cluster size increases and the medium noise increases. The Cr content of higher than 24 at % is not preferable for the following reason. That is, the ratio of residual magnetization (Mr) to saturation magnetization (Ms), Mr/Ms, and the coercive force Hc are lowered.

The Pt content of lower than 14 at % is not preferable for the following reason. That is, the effect of improving read/write characteristics becomes insufficient and the ratio of residual magnetization (Mr) to saturation magnetization (Ms), Mr/Ms, is lowered and the thermal stability deteriorates. The Pt content of higher than 24 at % is not preferable because noise increases.

As used herein, the major constituent means the constituent included in the amount of higher than 50 at %.

The perpendicular magnetic film 5 preferably has a B content equal or higher than 0.1 at % and lower than 5 at %, in addition to Co, Cr and Pt. The use of B makes it possible to reduce the magnetic cluster size and to improve read/write characteristics.

When using a CoCrPt alloy in the perpendicular magnetic film 5, elements can be freely added, in addition to B. Examples of the elements include, but are not limited to, Ta, Mo, Nb, Hf, Ir, Cu and Ru.

The perpendicular magnetic film 5 can have a single layer structure made of the CoCrPt material described above, or it can have a two or multiple layer structure including a layer comprising the CoCrPt alloy material and a layer comprising a material different from the CoCrPt alloy material.

Also, a perpendicular magnetic film can have a multiple layer structure in which a Co alloy (CoCr, CoB, Co—$SiO_2$ or the like) layer and a Pd alloy (PdB, Pd—$SiO_2$ or the like) layer are laminated, or can have a multiple layer structure including an amorphous material layer comprising TbFeCo and a CoCrPt alloy material layer.

The thickness of the perpendicular magnetic film 5 is preferably set within a range from 3 to 60 nm (preferably from 5 to 40 nm). When the thickness of the perpendicular magnetic film 5 falls below the above range, sufficient magnetic flux cannot be obtained and the read back output is lowered. The thickness of higher than the above range of the perpendicular magnetic film 5 is not preferable because magnetic grains in the perpendicular magnetic film 5 become coarse and read/write characteristics deteriorate.

The coercive force Hc of the perpendicular magnetic film 5 is set to 3000 (Oe) or higher. The magnetic recording medium having the coercive force of lower than 3000 (Oe) is not preferable because it is not suited to increase the recording density and is also inferior in thermal stability.

The ratio of residual magnetization (Mr) to saturation magnetization (Ms), Mr/Ms, of the perpendicular magnetic film 5 is preferably equal to or higher than 0.9. The magnetic recording medium having Mr/Ms of less than 0.9 is not preferable because it is inferior in thermal stability.

The negative nucleation field (–Hn) of the perpendicular magnetic film 5 is preferably equal to or higher than 0 (Oe) and lower than 2500 (Oe). The magnetic recording medium having the negative nucleation field (–Hn) of lower than 0 (Oe) is not preferable because of poor thermal stability.

The negative nucleation field (–Hn) will now be described.

Figure 3:
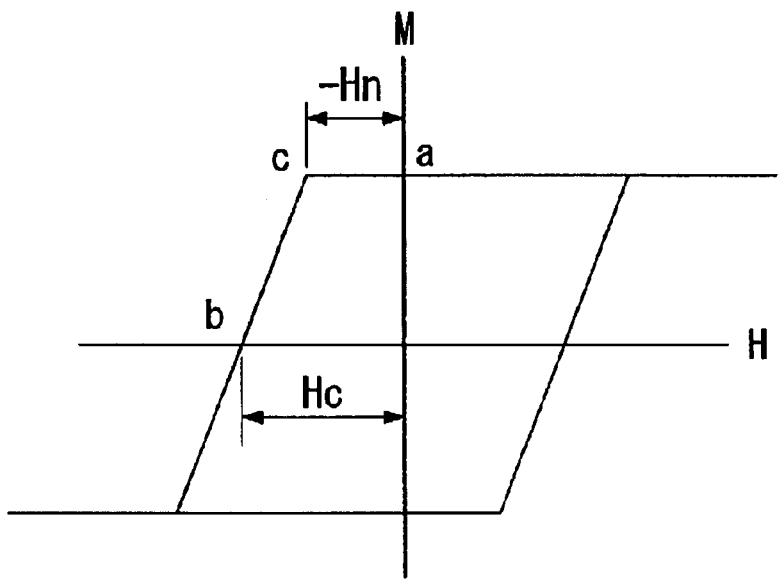
FIG. 3 is a graph showing an example of a MH curve.

As shown in FIG. 3, the negative nucleation field (–Hn) is the numerical value represented by the distance (Oe) between the point "a" and the point "c" in a MH curve, where the point "a" is a point at which the external magnetic field becomes 0 in the process of decreasing the external magnetic field from a saturated state of the magnetization, the point "b" is a point at which the magnetization becomes 0, and the point "c" is a point of intersection of a tangent which touches the MH curve at the point "a" and a line which shows saturation magnetization.

Figure 4:
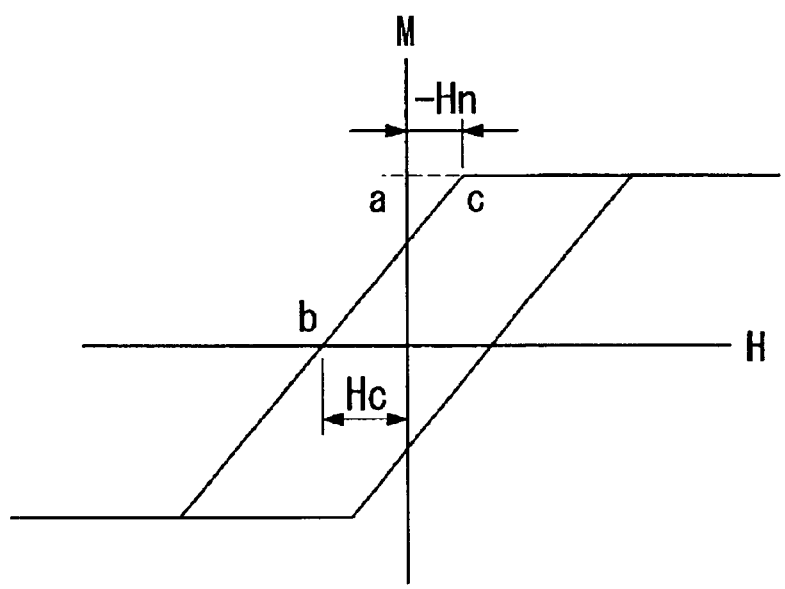
FIG. 4 is a graph showing another example of a MH curve.

Moreover, the negative nucleation field (–Hn) takes a positive value in the case in which the point "c" is in a region in which the external magnetic field becomes negative (see FIG. 3), and conversely, takes a negative value in the case in which the point "c" is in a region in which the external magnetic field becomes positive (see FIG. 4).

A perpendicular magnetization anisotropy constant Ku of the perpendicular magnetic film 5 is preferably equal to or higher than $1\times10^6$ erg/cc.

The method of measuring the perpendicular magnetization anisotropy constant Ku will now be described.

When a sufficiently large magnetic field is applied to the sample using a magnetic torque device, thereby forming a single domain as a magnetic domain of a magnetic film, a rotary power, which allows the axis of easy magnetization to correspond to the direction of the magnetic field, is applied in the magnetic film.

Torque T can be represented by $Ku \cdot \cos 4\phi$, where $\phi$ is an angle between the direction at which the magnetic field is applied and the direction of the axis of easy magnetization.

As described above, torque becomes a periodic function of $\phi$ and the perpendicular magnetization anisotropy constant Ku can be decided by Fourier analysis of the curve by which torque is represented.

In the magnetic recording medium, when the orientation control film 3 is made of a non-magnetic material which contains 33 to 80 at % of Ni and also contains one or more kinds of elements selected from Sc, Y, Ti, Zr, Hf, Nb and Ta, excellent error rate and excellent thermal stability can be obtained.

This effect is particularly excellent when the perpendicular magnetization anisotropy constant Ku of the perpendicular magnetic film 5 is equal to or higher than $1 \times 10^6$ erg/cc.

Table 1 shows characteristics of the case where NiTa, Ti or C is used in the orientation control film 3 and the perpendicular magnetization anisotropy constant Ku is set within a range from $0.7 \times 10^6$ to $0.9 \times 10^6$ erg/cc (Examples 1 to 3) and characteristics of the case where the perpendicular magnetization anisotropy constant Ku is set within a range from $1.5 \times 10^6$ to $1.8 \times 10^6$ erg/cc (Examples 4 to 6).

As used herein, the term "$\Delta\theta 50$" means inclined distribution of the film and specifically refers to a half-value of a peak of a rocking curve relating to the specific orientation plane on the surface of the film. The smaller the numerical value of $\Delta\theta 50$, the higher the crystal orientation of the film.

An example of the method of measuring $\Delta\theta 50$ will now be described.

(1) Determination of Peak Position

Figure 5:
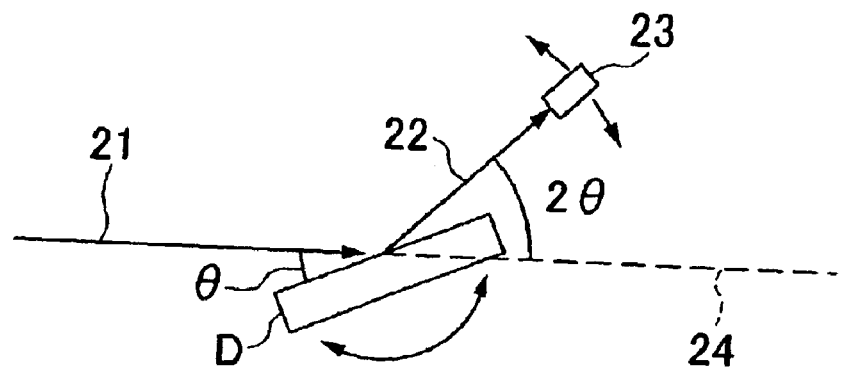
FIG. 5 is an explanatory view for explaining a method of measuring $\Delta\theta 50$.

As shown in FIG. 5, a disk D, in which a perpendicular magnetic film 5 has been formed in the surface side, is irradiated with an incident X-ray 21 and a diffraction X-ray 22 is detected by a diffraction X-ray detector 23.

The position of the detector 23 is set so that the angle of the diffraction X-ray 22 detected by the detector 23 to the incident X-ray 21 (the angle of the diffraction X-ray 22 to an extension line 24 of the incident X-ray 21) becomes two times larger than an incident angle $\theta$ of the incident X-ray 21 to the surface of the disk D, that is, $2\theta$.

The intensity of the diffraction X-ray 22 is measured by the detector 23 using a $\theta$–$2\theta$ scanning method wherein, during the irradiation with the incident X-ray 21, the incident angle $\theta$ of the incident X-ray 21 is changed by changing the direction of the disk D and, at the same time, the position of the detector 23 is charged while maintaining the angle of the diffraction X-ray 22 to the incident X-ray 21 at $2\theta$ (the angle that is two times larger than the incident angle $\theta$ of the incident X-ray 21).

Consequently, a relationship between $\theta$ and the intensity of the diffraction X-ray 22 is examined, thereby to determine the position of the detector 23, where the intensity of the diffraction X-ray 22 becomes maximum. The angle $2\theta$ of the diffraction X-ray 22 at this position of the detector to the incident X-ray 21 refers to $2\theta p$.

TABLE 1

|  | ORIENTATION CONTROL UNDERCOAT FILM | MAGNETIC FILM (at %) | ERROR RATE ($10^X$) | THERMAL STABILITY (%/DECADE) | Ku (erg/cc) |
|---|---|---|---|---|---|
| EXAMPLE 1 | NiTa | 66Co—20Cr—12Pt—2B | −5.1 | −1.8 | $0.9 \times 10^6$ |
| EXAMPLE 2 | Ti | 66Co—20Cr—12Pt—2B | −3.8 | −2.5 | $0.8 \times 10^6$ |
| EXAMPLE 3 | C | 66Co—20Cr—12Pt—2B | −4.2 | −2.9 | $0.7 \times 10^6$ |
| EXAMPLE 4 | NiTa | 61Co—20Cr—17Pt—2B | −5.6 | −0.5 | $1.7 \times 10^6$ |
| EXAMPLE 5 | Ti | 61Co—20Cr—17Pt—2B | −3.2 | −0.4 | $1.8 \times 10^6$ |
| EXAMPLE 6 | C | 61Co—20Cr—17Pt—2B | −3.5 | −1.8 | $1.5 \times 10^6$ |

As is apparent from Table 1, as compared with the case of using Ti or C in the orientation control film 3 (Examples 2, 3, 5 and 6), the read/write characteristics (error rate) and the thermal stability were improved when using NiTa in the orientation control film 3 (Examples 1 and 4).

As is apparent from a comparison in this improving effect between the medium having small Ku of the perpendicular magnetic film 5 (Examples 1 to 3) and the medium having large Ku (Examples 4 to 6), a larger improving effect could be obtained in the case where Ku is large (Example 4).

As is apparent from this fact, the effect of improving magnetic characteristics obtained by using NiTa in the orientation control film 3 becomes more superior as Ku becomes larger.

$\Delta\theta 50$ of the perpendicular magnetic film 5 is preferably within a range from 2 to 10°.

$\Delta\theta 50$ of lower than 2° is not preferable because exchange coupling between magnetic grains increases and read/write characteristics deteriorate. $\Delta\theta 50$ of higher than 10° is not preferable because the of residual magnetization (Mr) to saturation magnetization (Ms), Mr/Ms, deteriorates and the thermal stability deteriorates.

The crystal plane, that is dominant in the film, can be determined from the resulting angle $2\theta p$.

(2) Determination of Rocking Curve

Figure 6:
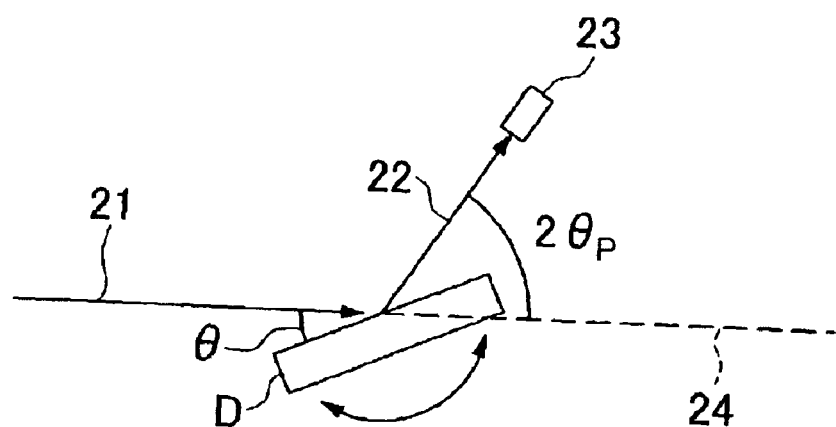
FIG. 6 is an explanatory view for explaining a method of measuring $\Delta\theta 50$.

As shown in FIG. 6, the incident angle $\theta$ of the incident X-ray 21 is changed by changing the direction of the disk D in the state that the detector 23 is fixed to the position where the angle $2\theta$ of the diffraction X-ray 22 became $2\theta p$, thereby to make a rocking curve showing a relationship between the incident angle $\theta$ and the intensity of the diffraction X-ray 22 detected by the detector 23.

Since the position of the detector 23 is fixed to the position where the angle $2\theta$ of the diffraction X-ray 22 became $2\theta p$, the rocking curve shows the distribution of gradient of the crystal plane of the surface of the film to the plane of the disk D.

Figure 7:
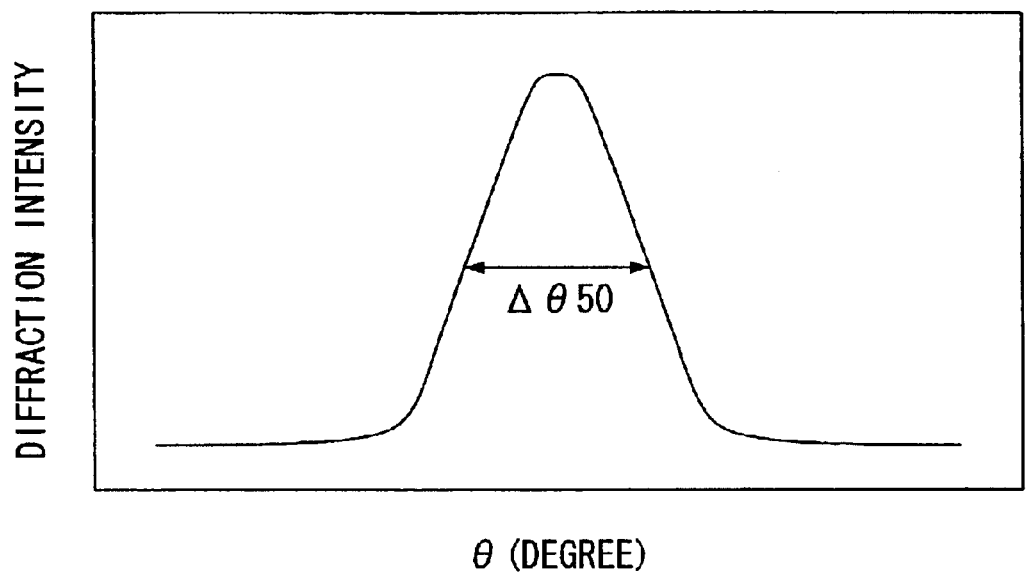
FIG. 7 is a graph showing an example of a rocking curve.

FIG. 7 is a graph showing an example of the rocking curve. The term "$\Delta\theta 50$" refers to a half-value width of a peak that shows the orientation plane in this rocking curve.

In the perpendicular magnetic film 5, the mean grain diameter of crystal grains is preferably within a range from 5 to 15 nm.

The mean grain diameter can be determined, for example, by observing crystal grains of the perpendicular magnetic film 5 by a transmission electron microscope (TEM) and image-processing the image observed.

The protective film 6 is for preventing corrosion of the perpendicular magnetic film 5, and at the same time, prevents damage to the medium surface when the magnetic head comes into contact with the medium. Conventionally well-known materials can be used and, for example, a material containing C, $SiO_2$, or $ZrO_2$ can be used.

The thickness of the protective film 6 is preferably within a range from 1 to 10 nm.

It is preferable to use, as a lubricant 7, perfluoropolyether, fluorinated alcohol, fluorinated carboxylic acid, or the like.

In the magnetic recording medium with the above construction, since the orientation control film 3 is made of a non-magnetic material which contains 33 to 80 at % of Ni and also contains one or more kinds of elements selected from Sc, Y, Ti, Zr, Hf, Nb and Ta, the coercive force Hc is enhanced and Mr/Ms is improved, thereby making it possible to increase the negative nucleation field (−Hn).

Therefore, excellent thermal stability can be obtained. Furthermore, read/write characteristics can be improved.

The thermal stability refers to a phenomenon wherein recording bits become unstable and thermal missing of recorded data occurs. In the magnetic recording medium apparatus, it appears as damping over elapse of time of the read back output of recorded data.

In the present invention, when the perpendicular magnetic film has a multiple layer structure composed of plural layers, at least one of these layers may be provided with the construction of the perpendicular magnetic film 5 in the first embodiment described above.

Figure 8:
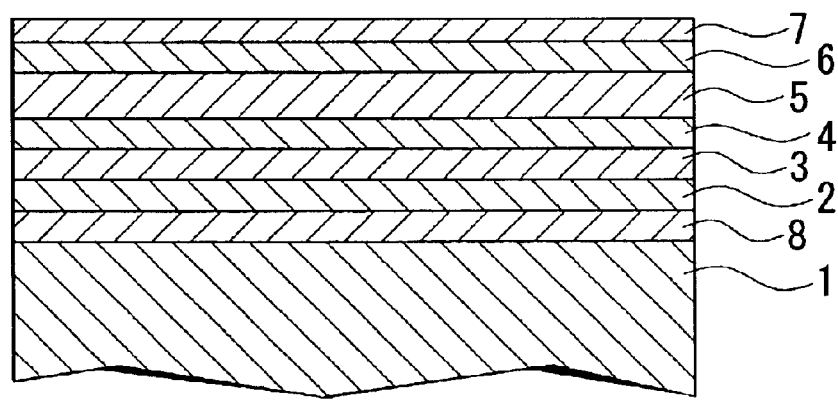
FIG. 8 is a partially sectional view showing the second embodiment of a magnetic recording medium of the present invention.

FIG. 8 shows the second embodiment of the magnetic recording medium of the present invention. In this magnetic recording medium, a hard magnetic film 8 made of a hard magnetic material is provided between a non-magnetic substrate 1 and a soft magnetic undercoat film 2.

It is preferable to use, in the hard magnetic film 8, a CoSm alloy or a $CoCrPtX_2$ alloy ($X_2$: one or more kinds of elements selected from Pt, Ta, Zr, Nb, Cu, Re, Ni, Mn, Ge, Si, O, N and B).

The coercive force Hc of the hard magnetic film 8 is preferably equal to or higher than 500 (Oe) (preferably equal to or higher than 1000 (Oe)).

The thickness of the hard magnetic film 8 is preferably equal to or lower than 150 nm (preferably equal to or lower than 70 nm). A thickness of more than 150 nm of the hard magnetic film 8 is not preferable because the mean surface roughness Ra of the orientation control film 3 becomes larger.

The hard magnetic film 8 is preferably provided with such a construction that exchange coupling between the hard magnetic film and the soft magnetic undercoat film 2 is formed and the magnetic film is magnetized in the radial direction of the substrate.

By providing the hard magnetic film 8, formation of extremely large magnetic domains in the soft magnetic undercoat film 2 can be suppressed more effectively, and therefore the occurrence of spike noise due to magnetic domains can be prevented and the error rate during recording and read back can be sufficiently lowered.

To enhance the orientation of the hard magnetic film 8, an undercoat film made of a Cr alloy or a B2 structural material may be formed between anon-magnetic substrate 1 and a hard magnetic film 8.

Figure 9:
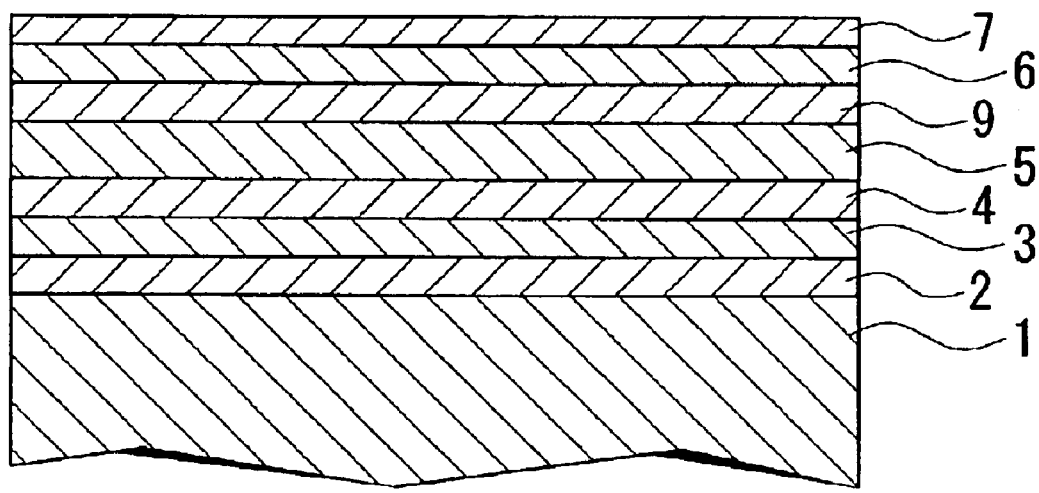
FIG. 9 is a partially sectional view showing the third embodiment of a magnetic recording medium of the present invention.

FIG. 9 shows the third embodiment of the magnetic recording medium of the present invention. In this magnetic recording medium, a magnetizing stabilization film 9 made of a soft magnetic material is provided between a perpendicular magnetic film 5 and a protective film 6.

Examples of the material of the magnetizing stabilization film 9 include FeCo alloys (FeCo, FeCoV and the like), FeNi alloys (FeNi, FeNiMo, FeNiCr, FeNiSi and the like), FeAl alloys (FeAl, FeAlSi, FeAlSiCr, FeAlSiTiRu, FeAlO and the like), FeCr alloys (FeCr, FeCrTi, FeCrCu and the like), FeTa alloys (FeTa, FeTaC, FeTaN and the like), FeMg alloys (FeMgO and the like), FeZr alloys (FeZrN and the like), FeC alloys, FeN alloys, FeSi alloys, FeP alloys, FeNb alloys, FeHf alloys, and FeB alloys.

There can also be used a material having an Fe content equal to or higher than 60 at % composed of microcrystals comprising FeAlO, FeMgO, FeTaN, FeZrN or the like. In addition, it can also have a granular structure in which the microcrystals are dispersed in a matrix.

As the material of the magnetizing stabilization film 9, a Co alloy having an amorphous structure, which contains 80 at % or higher of Co and also contains at least one or more of Zr, Nb, Ta, Cr, Mo or the like, can be used.

For example, CoZr, CoZrNb, CoZrTa, CoZrCr, and CoZrMo alloys can be used advantageously as the material.

The coercive force Hc of the magnetizing stabilization film 9 is preferably equal to or lower than 200 (Oe) (preferably equal to or lower than 50 (Oe)).

The saturation magnetic density Bs of the magnetizing stabilization film 9 is preferably equal to or higher than 0.4 T (preferably equal to or higher than 1 T).

Bs·t, that is the product of the saturation magnetic density Bs of the material and the film thickness t of the magnetizing stabilization film 9, is preferably equal to or higher than 7.2 T·nm. Bs·t that exceeds the above range is not preferable because the read back output is lowered.

By providing a magnetizing stabilization film 9 made of a soft magnetic film between a perpendicular magnetic film 5 and a protective film 6, an improvement in thermal stability and an increase in read back output can be achieved.

This reason is believed to be as follows. That is, the fluctuation of the magnetization in the surface of the perpendicular magnetic film 5 is stabilized by the magnetizing stabilization film 9, so that leakage flux is not influenced by this fluctuation and the read back output increases. In addition, by providing the magnetizing stabilization film 9, the magnetization of the perpendicular magnetic film 5 in the perpendicular direction and the magnetization of the soft magnetic undercoat film 2 and the magnetizing stabilization film 9 in the in-plane direction form a closed circuit. Due to this action, excellent thermal stability is obtained because the magnetization of the perpendicular magnetic film 4 is established more strongly in the perpendicular direction.

In the manufacture of the magnetic recording medium having the construction described above, a soft magnetic undercoat film 2, an orientation control film 3, an intermediate film 4 and a perpendicular magnetic film 5 are formed in sequence on a substrate 1 by a sputtering method, vacuum deposition, ion plating or the like.

An oxidizing treatment can be carried out on the surface of the soft magnetic undercoat film 2, if necessary.

In the formation of the orientation control film 3, a non-magnetic material, which contains 33 to 80 at % of Ni and also contains one or more kinds of elements selected from Sc, Y, Ti, Zr, Hf, Nb and Ta, is used.

The orientation control film 3 can contain at least one of oxygen and nitrogen. A method that introduces oxygen or nitrogen into the film-forming gas (process gas) when forming the orientation control film 3 can be used.

In the formation of the perpendicular magnetic film 5, the material and film-forming conditions are preferably selected so that the perpendicular magnetization anisotropy constant Ku becomes 1×10⁶ erg/cc or higher.

In the formation of the perpendicular magnetic film 5, the material and film-forming conditions are preferably selected so that "$\Delta\theta 50$" is set within range from 2 to 10°.

Next, the protective film 6 is preferably formed by a plasma CVD method, an ion beam method, a sputtering method or the like.

To form a lubricant 7, conventionally well-known methods such as dip coating method and spin coating method can be employed.

In the manufacture of the magnetic recording medium shown in FIG. 8, a hard magnetic film 8 is formed between a substrate 1 and a soft magnetic undercoat film 2 by a sputtering method. In the manufacture of the magnetic recording medium shown in FIG. 9, a magnetizing stabilization film 9 is formed between a perpendicular magnetic film 5 and a protective film 6 by a sputtering method.

Figure 10A:
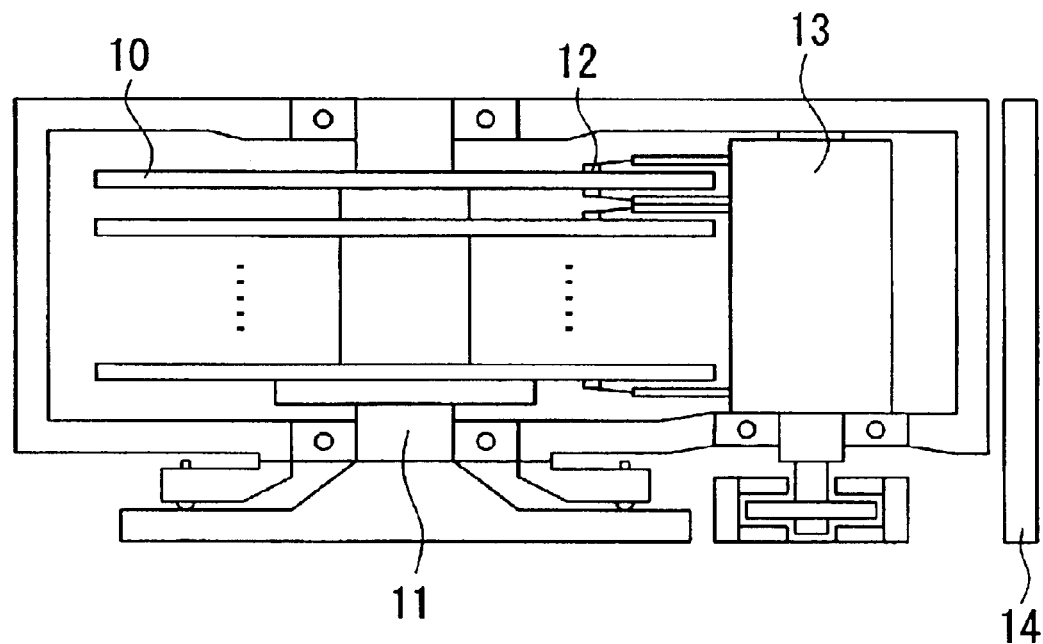
FIG. 10(a) shows the entire structure.
Figure 10B:
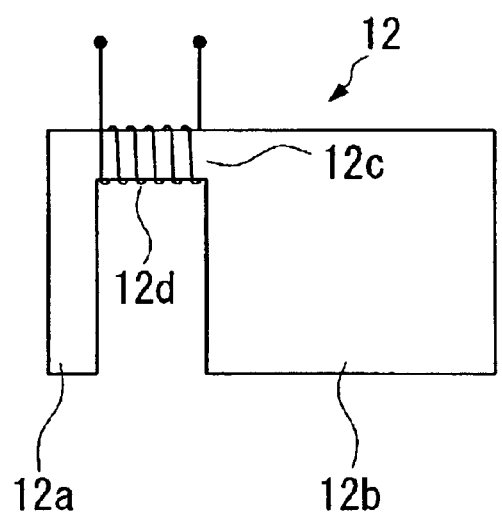
FIG. 10(b) shows a magnetic head.

FIG. 10 is a sectional structural view showing an example of the magnetic read/write apparatus according to the present invention. The magnetic read/write apparatus shown in this drawing comprises a magnetic recording medium 10 having the construction described above, a medium drive unit 11 that rotates this magnetic recording medium 10, a magnetic head 12 that carries out recording and read back of the information on the magnetic recording medium 10, a head drive unit 13 that drives the magnetic head 12, and a read/write signal processing system 14. The read back signal processing system 14 sends a recorded signal to the magnetic head 12 after processing the input data, and outputs the data after processing the read back signal from the magnetic head 12.

Examples of the magnetic head 12 include a single pole type head for perpendicular recording.

As shown in FIG. 10(*b*), as the single pole type head, a single pole type head with a construction comprising a main magnetic pole 12*a*, an auxiliary magnetic pole 12*b* and a coil 12*d* provided at a connection unit 12*c* that connects these magnetic poles can be preferably used.

According to the magnetic read/write apparatus described above, since the magnetic recording medium 10 is used, the thermal stability and read/write characteristics can be enhanced.

Therefore, it is made possible to prevent problems such as data missing and to increase high recording density.

EXAMPLES

The operational effect of the present invention will now be clarified by way of examples. However, the present invention is not limited to the following examples.

Example 1

A washed glass substrate 1 (Ohara Co.; diameter: 2.5 inches) was accommodated in the film formation chamber of a DC magnetron sputtering apparatus (ANELVA, C-3010), and after expelling air in the film formation chamber up to an ultimate vacuum of 1×10⁻⁵ Pa, a soft magnetic undercoat film 2 (thickness: 100 nm) was formed on the glass substrate 1 using a target comprising 89Co-4Zr-7Nb (Co content: 89 at %, Zr content: 4 at %, Nb content: 7 at %) at a substrate temperature of 100° C. or lower. Using a vibrating sample magnetometer (VSM), it was confirmed that Bs·t (T·nm), that is the product of the saturation magnetic density Bs (T) of this film and the film thickness t (nm), is 110 (T·nm).

After heating the substrate to 200° C., an orientation control film 3 having a thickness of 8 nm was formed on the soft magnetic undercoat film 2 using a 60Ni-40Ta target and an intermediate layer 4 having a thickness of 5 nm was formed thereon using a 65Co-30Cr-5B target, and then a perpendicular magnetic film 5 having a thickness of 25 nm was formed thereon using a 61Co-20Cr-17Pt-2B target. In the sputtering step, a film was formed under a pressure of 0.5 Pa using argon as a process gas for forming a film.

Next, a protective film 6 having a thickness of 5 nm was formed by a CVD method.

Next, a lubrication film 7 made of perfluoropolyether was formed by a dip coating method to obtain a magnetic recording medium (see Table 2).

To confirm the crystal structure of the orientation control film 3, a soft magnetic undercoat film 2 (89Co-4Zr-7Nb) was formed on the substrate 1 and an orientation control film 3 (thickness: 8 nm) made of 60Ni-40Ta was formed thereon, and then the electron diffraction image of the orientation control film 3 was examined. As a result, it has been found that the crystal of the orientation control film 3 has an hcp structure.

Examples 2 to 13

In the same manner as in Example 1, except that the composition or thickness of the orientation control film 3 was changed, magnetic recording media were manufactured (see Table 2)

Comparative Examples 1 to 3

In the same manner as in Example 1, except that the orientation control film 3 was formed using a target made of Ti, 60Ru-40Co or C, magnetic recording media were manufactured (see Table 2).

Comparative Examples 4 and 5

In the same manner as in Example 1, except that the orientation control film 3 was formed using a target made of 85Ni-15Ta or 25Ni-75Ta, magnetic recording media were manufactured (see Table 2).

With respect to magnetic recording media of these Examples and Comparative Example, read/write characteristics and magnetostatic characteristics were evaluated. The evaluation was conducted using a read write analyzer RWA1632 manufactured by GUZIK Co. and a spin stand S1701MP.

In the evaluation of magnetic characteristics, the measurement was conducted at a recording frequency of 520 kFCI using a magnetic head wherein a single magnetic pole head is used at the writing portion and a GMR element is used at the read back portion.

The evaluation of the thermal stability was made by calculating the decrease rate (%/decade) of the output of the read back output after writing at a track recording density of 50 kFCI under the conditions of 70° C. one second after writing based on (So−S)×100/(So×3). In this equation, So denotes the read back output when one second has passed after the signal recording onto the magnetic recording medium, and S denotes the read back output after 1000 seconds.

The dispersion degree of the c axis of the perpendicular magnetic film 5 was calculated from the rocking curve. It is expressed by a half-value width ($\Delta\theta 50$) of a maximum intensity. These test results are shown in Table 2.

TABLE 2

| | SOFT MAGNETIC UNDERCOAT FILM | | ORIENTATION CONTROL FILM | | INTERMEDIATE FILM | PERPENDICULAR MAGNETIC FILM |
|---|---|---|---|---|---|---|
| | COMPOSITION | Bs · T (T · nm) | COMPOSITION (at %) | THICKNESS (nm) | | |
| EXAMPLE 1 | CoZrNb | 110 | 60Ni—40Ta | 8 | *1 | *2 |
| EXAMPLE 2 | CoZrNb | 110 | 60Ni—40Hf | 8 | *1 | *2 |
| EXAMPLE 3 | CoZrNb | 110 | 55Ni—45Nb | 8 | *1 | *2 |
| EXAMPLE 4 | CoZrNb | 110 | 50Ni—50Y | 8 | *1 | *2 |
| EXAMPLE 5 | CoZrNb | 110 | 75Ni—25Zr | 8 | *1 | *2 |
| EXAMPLE 6 | CoZrNb | 110 | 65Ni—35Ti | 8 | *1 | *2 |
| EXAMPLE 7 | CoZrNb | 110 | 60Ni—30Nb—10Ta | 8 | *1 | *2 |
| EXAMPLE 8 | CoZrNb | 110 | 35Ni—33Y—32Zr | 8 | *1 | *2 |
| EXAMPLE 9 | CoZrNb | 110 | 60Ni—30Hf—10Cr | 8 | *1 | *2 |
| EXAMPLE 10 | CoZrNb | 110 | 65Ni—30Ta—5Zr | 8 | *1 | *2 |
| EXAMPLE 11 | CoZrNb | 110 | 60Ni—40Ta | 0.5 | *1 | *2 |
| EXAMPLE 12 | CoZrNb | 110 | 60Ni—40Ta | 18 | *1 | *2 |
| EXAMPLE 13 | CoZrNb | 110 | 60Ni—40Ta | 40 | *1 | *2 |
| COMPARATIVE EXAMPLE 1 | CoZrNb | 110 | Ti | 20 | *1 | *2 |
| COMPARATIVE EXAMPLE 2 | CcZrNb | 110 | 60Ru—40Co | 30 | *1 | *2 |
| COMPARATIVE EXAMPLE 3 | CoZrNb | 110 | C | 10 | *1 | *2 |
| COMPARATIVE EXAMPLE 4 | CoZrNb | 110 | 85Ni—15Ta | 8 | *1 | *2 |
| COMPARATIVE EXAMPLE 5 | CoZrNb | 110 | 25Ni—75Ta | 8 | *1 | *2 |

*1) INTERMEDIATE FILM: 65Co—30Cr—5B (thickness: 5 nm)
*2) PERPENDICULAR MAGNETIC FILM: 61Co—20Cr—17Pt—2B (thickness: 25 nm)

| | READ/WRITE CHARCTERISTICS ERROR RATE | THERMAL STABILITY | MAGNETOSTATIC CHARATERISTICS | | | | PERPENDICULAR MAGNETIC FILM |
|---|---|---|---|---|---|---|---|
| | ($10^x$) | (%/DECADE) | Hc (Oe) | Mr/Ms | −Hn (Oe) | Ku (erg/cc) | Δθ50 (°) |
| EXAMPLE 1 | −5.6 | −0.5 | 4064 | 0.96 | 736 | $1.7 \times 10^6$ | 6.1 |
| EXAMPLE 2 | −5.3 | −0.7 | 3828 | 0.93 | 526 | $1.7 \times 10^6$ | 5.8 |
| EXAMPLE 3 | −5.4 | −0.5 | 3607 | 0.93 | 430 | $1.8 \times 10^6$ | 6.1 |
| EXAMPLE 4 | −5.1 | −0.6 | 3934 | 0.96 | 556 | $1.6 \times 10^6$ | 6.8 |
| EXAMPLE 5 | −5.7 | −0.5 | 3791 | 0.95 | 708 | $1.7 \times 10^6$ | 5.7 |
| EXAMPLE 6 | −5.2 | −0.7 | 3503 | 0.94 | 644 | $1.7 \times 10^6$ | 6.0 |
| EXAMPLE 7 | −5.9 | −0.4 | 4241 | 0.93 | 721 | $1.9 \times 10^6$ | 5.2 |
| EXAMPLE 8 | −5.5 | −0.6 | 4047 | 0.93 | 532 | $1.7 \times 10^6$ | 6.7 |
| EXAMPLE 9 | −6.0 | −0.6 | 3646 | 0.95 | 624 | $1.8 \times 10^6$ | 6.1 |
| EXAMPLE 10 | −5.9 | −0.4 | 4187 | 0.97 | 797 | $1.6 \times 10^6$ | 5.3 |
| EXAMPLE 11 | −5.5 | −0.6 | 3590 | 0.97 | 579 | $1.7 \times 10^6$ | 6.8 |
| EXAMPLE 12 | −5.5 | −0.9 | 3576 | 0.91 | 230 | $1.6 \times 10^6$ | 6.6 |
| EXAMPLE 13 | −5.3 | −1.2 | 3552 | 0.90 | 140 | $1.8 \times 10^6$ | 8.1 |
| COMPARATIVE EXAMPLE 1 | −3.2 | −0.4 | 3180 | 0.99 | 1020 | $1.8 \times 10^6$ | 4.8 |
| COMPARATIVE EXAMPLE 2 | −4.2 | −0.6 | 3950 | 0.92 | 260 | $1.7 \times 10^6$ | 6.9 |
| COMPARATIVE EXAMPLE 3 | −3.5 | −1.8 | 3300 | 0.86 | — | $1.5 \times 10^6$ | 12.8 |
| COMPARATIVE EXAMPLE 4 | −3.8 | −0.4 | 3990 | 0.94 | 916 | $1.7 \times 10^6$ | 6.2 |
| COMPARATIVE EXAMPLE 5 | −3.5 | −1.2 | 3552 | 0.91 | 331 | $1.7 \times 10^6$ | 8.9 |

*1) INTERMEDIATE FILM: 65Co—30Cr—5B (thickness: 5 nm)
*2) PERPENDICULAR MAGNETIC FILM: 61Co—20Cr—17Pt—2B (thickness: 25 nm)

As is apparent from Table 2, Examples using a non-magnetic material, which contains 33 to 80 at % of Ni and also contains 20 at % or higher of one or more kinds of elements selected from Sc, Y, Ti, Zr, Hf, Nb and Ta in the orientation control film 3 exhibit excellent read/write characteristics as compared with Comparative Examples.

Examples 14 to 22

In the same manner as in Example 1, except for selecting the conditions the perpendicular magnetic film 5 as shown in Table 3, magnetic recording media were manufactured (see Table 3).

With respect to magnetic recording media of these Examples and Comparative Examples, the evaluation test was conducted. The results are shown in Table 3.

equal to or higher than 0.9 exhibit excellent magnetic characteristics as compared with Comparative Examples 4 and 5.

TABLE 3

| | SOFT MAGNETIC UNDERCOAT FILM | | | | PERPENDICULAR MAGNETIC FILM | |
|---|---|---|---|---|---|---|
| | COMPOSITION (at %) | Bs · t (T · nm) | ORIENTATION CONTROL FILM | INTERMEDIATE FILM | COMPOSITION (at %) | THICKNESS (nm) |
| EXAMPLE 1 | CoZrNb | 110 | *1 | *2 | 61Co—20Cr—17Pt—2B | 25 |
| EXAMPLE 14 | CoZrNb | 110 | *1 | *2 | 64Co—17Cr—17Pt | 25 |
| EXAMPLE 15 | CoZrNb | 110 | *1 | *2 | 58Co—24Cr—17Pt | 25 |
| EXAMPLE 16 | CoZrNb | 110 | *1 | *2 | 65Co—20Cr—14Pt | 25 |
| EXAMPLE 17 | CoZrNb | 110 | *1 | *2 | 57Co—20Cr—23Pt | 25 |
| EXAMPLE 18 | CoZrNb | 110 | *1 | *2 | 61Co—20Cr—17Pt—1Ir | 25 |
| EXAMPLE 19 | CoZrNb | 110 | *1 | *2 | 61Co—20Cr—17Pt—2Cu | 25 |
| EXAMPLE 20 | CoZrNb | 110 | *1 | *2 | 61Co—20Cr—13Pt | 25 |
| EXAMPLE 21 | CoZrNb | 110 | *1 | *2 | 55Co—20Cr—25Pt | 25 |
| EXAMPLE 22 | CoZrNb | 110 | *1 | *2 | 56Co—25Cr—17Pt | 25 |

*1) ORIENTATION CONTROL FILM: 60Ni—40Ta (thickness: 8 nm)
*2) INTERMEDIATE FILM: 65Co—30Cr—5B (thickness: 5 nm)

| | READ/WRITE CHARACTERISTICS ERROR RATE | THERMAL STABILITY | MAGNETOSTATIC CHARACTERISTICS | | | |
|---|---|---|---|---|---|---|
| | ($10^x$) | (%/DECADE) | Hc (Oe) | Mr/Ms | −Hn (Oe) | Ku (erg/cc) |
| EXAMPLE 1 | −5.6 | −0.5 | 4064 | 0.96 | 736 | $1.7 \times 10^6$ |
| EXAMPLE 14 | −5.0 | −0.3 | 4049 | 0.98 | 1488 | $2.7 \times 10^6$ |
| EXAMPLE 15 | −5.4 | −1.1 | 3369 | 0.91 | 108 | $1.2 \times 10^6$ |
| EXAMPLE 16 | −5.1 | −0.9 | 3610 | 0.91 | 233 | $1.1 \times 10^6$ |
| EXAMPLE 17 | −5.0 | −0.8 | 3511 | 0.92 | 330 | $1.5 \times 10^6$ |
| EXAMPLE 18 | −5.5 | −0.4 | 3557 | 0.96 | 537 | $2.1 \times 10^6$ |
| EXAMPLE 19 | −5.4 | −0.3 | 4421 | 0.99 | 1040 | $2.1 \times 10^6$ |
| EXAMPLE 20 | −4.4 | −1.8 | 3699 | 0.83 | — | $0.9 \times 10^6$ |
| EXAMPLE 21 | −4.1 | −0.8 | 2961 | 0.87 | — | $0.9 \times 10^6$ |
| EXAMPLE 22 | −5.4 | −2.9 | 2880 | 0.76 | — | $0.8 \times 10^6$ |

*1) ORIENTATION CONTROL FILM: 60Ni—40Ta (thickness: 8 nm)
*2) INTERMEDIATE FILM: 65Co—30Cr—5B (thickness: 5 nm)

As is apparent from Table 3, magnetic recording media wherein the Cr content is equal to or higher than 16 at % and lower than 24 at % and the Pt content is equal to or higher than 14 at % and lower than 24 at % exhibit excellent magnetic characteristics as compared with Examples wherein the Cr content and the Pt content deviate from the above range.

It is also apparent that Examples wherein the coercive force (Hc) is equal to or higher than 3000 (Oe) and the negative nucleation field (−Hn) is equal to or higher than 0 (Oe) and lower than 2500 (Oe) and, moreover, Mr/Ms is Examples 23 to 29

In the same manner as in Example 1, except for selecting the composition of the soft magnetic undercoat film 2 as shown in Table 4, magnetic recording media were manufactured (see Table 4).

With respect to magnetic recording media of these Examples, the evaluation test was conducted. The results are shown in Table 4.

TABLE 4

| | SOFT MAGNETIC UNDERCOAT FILM | | ORIENTATION CONTROL FILM | | INTERMEDIATE FILM | |
|---|---|---|---|---|---|---|
| | COMPOSITION (at %) | Bs · t (T · nm) | COMPOSITION (at %) | THICKNESS (nm) | COMPOSITION (at %) | THICKNESS (nm) |
| EXAMPLE 1 | CoZrNb | 110 | 60Ni—40Ta | 8 | 65Co—30Cr—5B | 5 |
| EXAMPLE 23 | CoTaZr | 110 | 60Ni—40Ta | 8 | 65Co—30Cr—5B | 5 |
| EXAMPLE 24 | FeAlSi | 110 | 60Ni—40Ta | 8 | 65Co—30Cr—5B | 5 |
| EXAMPLE 25 | FeTaC | 110 | 60Ni—40Ta | 8 | 65Co—30Cr—5B | 5 |
| EXAMPLE 26 | FeAlO | 110 | 60Ni—40Ta | 8 | 65Co—30Cr—5B | 5 |
| EXAMPLE 27 | CoZrNb | 5 | 60Ni—40Ta | 8 | 65Co—30Cr—5B | 5 |
| EXAMPLE 28 | CoZrNb | 20 | 60Ni—40Ta | 8 | 65Co—30Cr—5B | 5 |
| EXAMPLE 29 | CoZrNb | 400 | 60Ni—40Ta | 8 | 65Co—30Cr—5B | 5 |

TABLE 4-continued

*1) PERPENDICULAR MAGNETIC FILM: 61Co—20Cr—17Pt—2B (thickness: 25 nm)

|  | PERPENDICULAR MAGNETIC FILM | READ/WRITE CHARACTERISTICS ERROR RATE ($10^x$) | THERMAL STABILITY (%/DECADE) | MAGNETOSTATIC CHARACTERISTICS | | |
|---|---|---|---|---|---|---|
|  |  |  |  | Hc (Oe) | Mr/Ms | −Hn (Oe) |
| EXAMPLE 1 | *1 | −5.6 | −0.5 | 4064 | 0.96 | 736 |
| EXAMPLE 23 | *1 | −5.5 | −0.6 | 3989 | 0.98 | 669 |
| EXAMPLE 24 | *1 | −5.3 | −0.6 | 4011 | 0.95 | 609 |
| EXAMPLE 25 | *1 | −5.7 | −0.5 | 3859 | 0.95 | 790 |
| EXAMPLE 26 | *1 | −5.8 | −0.7 | 3992 | 0.95 | 660 |
| EXAMPLE 27 | *1 | −5.3 | −0.6 | 4009 | 0.97 | 590 |
| EXAMPLE 28 | *1 | −5.5 | −0.5 | 3955 | 0.97 | 692 |
| EXAMPLE 29 | *1 | −5.6 | −0.6 | 4102 | 0.96 | 701 |

*1) PERPENDICULAR MAGNETIC FILM: 61Co—20Cr—17Pt—2B (thickness: 25 nm)

As is apparent from Table 4, in all Examples, excellent read/write characteristics could be obtained.

Examples 30 to 32

In the same manner as in Example 1, except that the soft magnetic undercoat film 2 was oxidized by exposing the surface thereof to an oxygen-containing gas (pure oxygen (100% $O_2$), 50% $O_2$-50% Ar, or air), magnetic recording media was manufactured (see Table 5).

With respect to magnetic recording media of these Examples, the evaluation test was conducted. The results are shown in Table 5.

As is apparent from Table 5, excellent read/write characteristics could be obtained by oxidizing the soft magnetic undercoat film 2.

Examples 33 to 39

In the same manner as in Example 1, except for electing the material and the thickness of the intermediate film 4 as shown in Table 6, magnetic recording media were manufactured (see Table 6).

With respect to magnetic recording media of these Examples, the evaluation test was conducted. The results are shown in Table 6.

TABLE 5

|  | SOFT MAGNETIC UNDERCOAT FILM | | | | INTERMEDIATE FILM | | |
|---|---|---|---|---|---|---|---|
|  | COMPOSITION (at %) | Bs · t (T · nm) | EXPOSURE GAS | OXIDIZED LAYER (nm) | COMPOSITION (at %) | THICKNESS (nm) | INTERMEDIATE FILM |
| EXAMPLE 1 | CoZrNb | 110 | — | — | 60Ni—40Ta | 8 | *1 |
| EXAMPLE 30 | CoZrNb | 110 | 100% $O_2$ | 2 | 60Ni—40Ta | 8 | *1 |
| EXAMPLE 31 | CoZrNb | 110 | 50% $O_2$-50% Ar | 1 | 60Ni—40Ta | 8 | *1 |
| EXAMPLE 32 | CoZrNb | 110 | Air | 2 | 60Ni—40Ta | 8 | *1 |

*1) INTERMEDIATE FILM: 65Co—30Cr—5B (thickness: 5 nm)
*2) PERPENDICULAR MAGNETIC FILM: 61Co—20Cr—17Pt—2B (thickness: 25 nm)

|  | PERPENDICULAR MAGNETIC FILM | READ/WRITE CHARACTERISTICS ERROR RATE ($10^x$) | THERMAL STABILITY (%/DECADE) | ORIENTATION CONTROL FILM | | |
|---|---|---|---|---|---|---|
|  |  |  |  | Hc (Oe) | Mr/Ms | −Hn (Oe) |
| EXAMPLE 1 | *2 | −5.6 | −0.5 | 4064 | 0.96 | 736 |
| EXAMPLE 30 | *2 | −5.9 | −0.6 | 4103 | 0.98 | 689 |
| EXAMPLE 31 | *2 | −5.8 | −0.6 | 3908 | 0.96 | 801 |
| EXAMPLE 32 | *2 | −5.8 | −0.5 | 3899 | 0.99 | 778 |

*1) INTERMEDIATE FILM: 65Co—30Cr—5B (thickness: 5 nm)
*2) PERPENDICULAR MAGNETIC FILM: 61Co—20Cr—17Pt—2B (thickness: 25 nm)

TABLE 6

| | SOFT MAGNETIC UNDERCOAT FILM | | ORIENTATION CONTROL FILM | | INTERMEDIATE FILM | |
|---|---|---|---|---|---|---|
| | COMPOSITION (at %) | Bs · T (T · nm) | COMPOSITION (at %) | THICKNESS (nm) | COMPOSITION (at %) | THICKNESS (nm) |
| EXAMPLE 1 | CoZrNb | 110 | 60Ni—40Ta | 8 | 65Co—30Cr—5B | 5 |
| EXAMPLE 33 | CoZrNb | 110 | 60Ni—40Ta | 8 | 65Co—30Cr—5Pt | 5 |
| EXAMPLE 34 | CoZrNb | 110 | 60Ni—40Ta | 8 | 54Co—28Cr—10Pt—8B | 5 |
| EXAMPLE 35 | CoZrNb | 110 | 60Ni—40Ta | 8 | 60Co—40Ru | 5 |
| EXAMPLE 36 | CoZrNb | 110 | 60Ni—40Ta | 8 | 55Co—45B | 5 |
| EXAMPLE 37 | CoZrNb | 110 | 60Ni—40Ta | 8 | — | — |
| EXAMPLE 38 | CoZrNb | 110 | 60Ni—40Ta | 8 | 65Co—30Cr—5B | 15 |
| EXAMPLE 39 | CoZrNb | 110 | 60Ni—40Ta | 8 | 65Co—30Cr—5B | 40 |

*1) PERPENDICULAR MAGNETIC FILM: 61Co—20Cr—17Pt—2B (thickness: 25 nm)

| | PERPENDICULAR MAGNETIC FILM | READ/WRITE CHARACTERISTICS ERROR RATE ($10^x$) | THERMAL STABILITY (%/DECADE) | MAGNETOSTATIC CHARACTERISTICS | | |
|---|---|---|---|---|---|---|
| | | | | Hc (Oe) | Mr/Ms | -Hn (Oe) |
| EXAMPLE 1 | *1 | −5.6 | −0.5 | 4064 | 0.96 | 736 |
| EXAMPLE 33 | *1 | −5.4 | −0.6 | 4030 | 0.97 | 1020 |
| EXAMPLE 34 | *1 | −5.9 | −0.6 | 4021 | 0.95 | 1100 |
| EXAMPLE 35 | *1 | −5.6 | −0.5 | 3991 | 0.96 | 1210 |
| EXAMPLE 36 | *1 | −5.8 | −0.6 | 4288 | 0.93 | 1260 |
| EXAMPLE 37 | *1 | −5.2 | −0.9 | 4010 | 0.94 | 660 |
| EXAMPLE 38 | *1 | −5.2 | −0.4 | 4515 | 0.97 | 1350 |
| EXAMPLE 39 | *1 | −4.6 | −0.4 | 4377 | 0.98 | 1300 |

*1) PERPENDICULAR MAGNETIC FILM: 61Co—20Cr—17Pt—2B (thickness: 25 nm)

As is apparent from Table 6, in all Examples, excellent read/write characteristics could be obtained.

Examples 40 to 42

In the same manner as in Example 1, except that an undercoat film (thickness: 20 nm) made of 94Cr-6Mo was provided between the non-magnetic substrate 1 and the soft magnetic undercoat film 2 and a hard magnetic film 8 shown in Table 7 was provided thereon, magnetic recording media were manufactured (see Table 7).

With respect to magnetic recording media of these Examples, the evaluation test was conducted. The results are shown in Table 7.

TABLE 7

| | HARD MAGNETIC FILM | | SOFT MAGNETIC UNDERCOAT FILM | | ORIENTATION CONTROL FILM | | INTERMEDIATE FILM |
|---|---|---|---|---|---|---|---|
| | COMPOSITION (at %) | THICKNESS (nm) | COMPOSITION (at %) | Bs · T (T · nm) | COMPOSITION (at %) | THICKNESS (nm) | |
| EXAMPLE 1 | — | — | CoZrNb | 110 | 60Ni—40Ta | 8 | *1 |
| EXAMPLE 40 | 64Co—20Cr—14Pt—2B | 50 | CoZrNb | 110 | 60Ni—40Ta | 8 | *1 |
| EXAMPLE 41 | 64Co—20Cr—14Pt—2B | 150 | CoZrNb | 110 | 60Ni—40Ta | 8 | *1 |
| EXAMPLE 42 | 84Co—16Sm | 50 | CoZrNb | 110 | 60Ni—40Ta | 8 | *1 |

*1) INTERMEDIATE FILM: 65Co—30Cr—5B (thickness: 5 nm)
*2) PERPENDICULAR MAGNETIC FILM: 61Co—20Cr—17Pt—2B (thickness: 25 nm)
*3) SLIGHT SPIKE NOISE GENERATED AT OUTER PERIPHERY

| | PERPENDICULAR MAGNETIC FILM | READ/WRITE CHARACTERISTICS ERROR RATE ($10^x$) | THERMAL STABILITY (%/DECADE) | MAGNETOSTATIC CHARACTERISTICS | | | SPIKE NOISE |
|---|---|---|---|---|---|---|---|
| | | | | Hc (Oe) | Mr/Ms | -Hn (Oe) | |
| EXAMPLE 1 | *2 | −5.6 | −0.5 | 4064 | 0.96 | 736 | *3 |
| EXAMPLE 40 | *2 | −5.5 | −0.6 | 4009 | 0.97 | 810 | NONE |
| EXAMPLE 41 | *2 | −5.5 | −0.5 | 4103 | 0.95 | 699 | NONE |
| EXAMPLE 42 | *2 | −5.3 | −0.6 | 3990 | 0.96 | 703 | NONE |

*1) INTERMEDIATE FILM: 65Co—30Cr—5B (thickness: 5 nm)
*2) PERPENDICULAR MAGNETIC FILM: 61Co—20Cr—17Pt—2B (thickness: 25 nm)
*3) SLIGHT SPIKE NOISE GENERATED AT OUTER PERIPHERY As is apparent from Table 7, spike-like noise caused by a magnetic wall in the soft magnetic undercoat film 2 could be suppressed without deteriorating the read/write characteristics.

As described above, the magnetic recording medium of the present invention comprises at least a soft magnetic undercoat film made of a soft magnetic material, an orientation control film that controls the orientation of a film provided right above, a perpendicular magnetic film, of which axis of easy magnetization is generally oriented perpendicular to a substrate, and a protective film, that are provided on a non-magnetic substrate, wherein the orientation control film is made of a non-magnetic material which contains 33 to 80 at % of Ni and one or more kinds of elements selected from Sc, Y, Ti, Zr, Hf, Nb and Ta. Therefore, read/write characteristics and thermal stability can be improved.

What is claimed is:

1. A magnetic recording medium comprising at least a soft magnetic undercoat film made of a soft magnetic material, an orientation control film that controls the orientation of a film provided directly thereabove, a perpendicular magnetic film, of which the axis of easy magnetization is generally oriented perpendicular to a substrate, and a protective film, that are provided on a non-magnetic substrate, wherein the orientation control film is made of a non-magnetic material which has an hcp structure and which contains 33 to 80 at % of Ni and one or more elements selected from Sc, Y, Ti, Zr, Hf, Nb and Ta.

2. The magnetic recording medium according to claim 1, wherein the orientation control film is made of at least one alloy selected from the group consisting of NiTa alloy, NiNb alloy, NiTi alloy and NiZr alloy.

3. The magnetic recording medium according to any one of claim 1 or 2, wherein a perpendicular magnetization anisotropy constant Ku of the perpendicular magnetic film is equal to or higher than $1 \times 10^6$ erg/cc.

4. The magnetic recording medium according to any one of claim 1 or 2, wherein the perpendicular magnetic film has a composition containing CoCrPt as the major constituent and also has a Cr content equal to or higher than 16 and lower than 24 at % and a Pt content equal to or higher than 14 and lower than 24 at %, and a coercive force (Hc) is equal to or higher than 3000(Oe), negative nucleation field (−Hn) is equal to or higher than 0(Oe) and lower than 2500(Oe), and a ratio of residual magnetization (Mr) to saturation magnetization (Ms), Mr/Ms, is equal to or higher than 0.9.

5. The magnetic recording medium according to any one of claim 1 or 2, wherein a mean crystal grain diameter of the orientation control film is equal to or higher than 2 nm and lower than 20 nm.

6. The magnetic recording medium according to any one of claim 1 or 2, wherein a thickness of the orientation control film is equal to or higher than 0.5 nm and lower than 20 nm.

7. The magnetic recording medium according to any one of claim 1 or 2, wherein the perpendicular magnetization has a B content equal to or higher than 0.1 at % and lower than 5 at % and Δθ50 is within a range from 2 to 10°.

8. The magnetic recording medium according to any one of claim 1 or 2, wherein a hard magnetic film made of a hard magnetic material is provided between the non-magnetic substrate and the soft magnetic undercoat film.

9. A method of manufacturing a magnetic recording medium, which comprises forming at least a soft magnetic undercoat film made of a soft magnetic material, an orientation control film that controls the orientation of a film provided right above, a perpendicular magnetic film of which axis of easy magnetization is generally oriented perpendicular to a substrate, and a protective film, on a non-magnetic substrate, wherein the forming of the orientation control film comprises forming the orientation control film with an hcp structure from a non-magnetic material which contains 33 to 80 at % of Ni and one or more elements selected from Sc, Y, Ti, Zr, Hf, Nb and Ta.

10. A magnetic read/write apparatus comprising a magnetic recording medium and a magnetic head that records information on the magnetic recording medium and plays the information, wherein the magnetic recording medium comprises at least a soft magnetic undercoat film made of a soft magnetic material, an orientation control film that controls the orientation of a film provided directly thereabove, a perpendicular magnetic film of which the axis of easy magnetization is generally oriented perpendicular to a substrate, and a protective film, that are provided on a non-magnetic substrate, and wherein the orientation control film is comprised of a non-magnetic material which has an hcp structure and which contains 33 to 80 at % of Ni and one or more elements selected from Sc, Y, Ti, Zr, Hf, Nb and Ta.

* * * * *